3,330,796
NON-BLOCKING POLYOLEFIN COMPOSITIONS
Henry W. Mock, Plainfield, and Walter A. Haine, Westfield, N.J., assignors to Union Carbide Corporation, a corporation of New York
No Drawing. Filed June 28, 1957, Ser. No. 668,625
11 Claims. (Cl. 260—32.6)

This invention relates to improvements in the slip and non-blocking properties of solid polyolefins such as polyethylene, polypropylene, copolymers of ethylene and propylene, and of ethylene and styrene.

A major use of polyolefins, and particularly polyethylene is in the production of thin films. Such films exhibit poor slip, i.e., do not slide readily over each other, which in turn results in poor handling characteristics. The poor slip behavior of the films interferes with their use in automatic processing equipment since the film must pass freely through the fabricating machine (e.g., heat sealer, bag maker, bag loader or filler, bag opener, overwrap packager) for it to operate properly and reproducibly.

Another disadvantage of polyolefin films is their tendency to block, that is, to resist separation by a separating force applied perpendicular to the film as by a simple lifting action. This phenomenon also results in poor handling characteristics. During the extrusion of tubular film layflat, for instance, blocking occurs at the nip rolls, particularly when extruding at high rates. The temperature of the film entering the nip rolls is high enough to cause the film layers to stick or adhere to each other. While this source of blocking can be eliminated by reducing the extrusion rate, this is economically undesirable.

In practice, film layers are normally separated by a combination of sliding and lifting forces. The lifting component is resisted by blocking forces and the sliding component is resisted by frictional forces. Blocking can be determined by measuring the perpendicular force required to separate one film layer from another. Slip can be determined by measuring the film's kinetic coefficient of friction as determined by the stationary sled-sliding film method. The blocking and sliding or slip forces are theoretically at right angles to each other.

The incorporation of various fatty acid amides in small quantities has been proposed to reduce the blocking of polyethylene film and to lower its coefficient of friction. While amides such as oleamide, stearamide, and the like are reasonably effective in thus improving polyethylene, particularly in film form, their use is attended by serious disadvantages such as poorer adhesive properties, namely that the film is less receptive to printing inks, resinous coatings such as polyvinyl acetate, adhesives such as dextrin based cements, and the like compared to the unmodified polyethylene.

Another disadvantage of such previously proposed amides stems from their unduly rapid "sweat-out" or exudation to the polyethylene surface and their excessive volatility. The amide exudate is particularly troublesome in the production of polyethylene film by the tubular extrusion process employing internal cooling formers or mandrels for shaping and sizing the film. The amide deposits on the surfaces of these forms and creates a drag on the films which causes film stretching and other film irregularities and even tearing of the film. This deposition appears to be caused in part by a mechanical wiping-off of the exudate from the film surface onto the former or mandrel and in part by volatilization of the amide followed by condensation onto the cold surface. Similar difficulties are encountered during polyethylene coating, particularly extrusion coating operations and the like wherein amide deposition occurs on the chill roll and causes surface imperfections in the polyethylene which render the products unacceptable.

Another disadvantage association with rapid, premature "sweat-out" of these amides is over-lubrication of the film surface during the film manufacturing process, such that the film when reeled up directly from the extruder or other film forming apparatus is too slippery to form a tightly wound reel.

The relatively high volatility of these amides makes them of little to no value when the composition is extruded in film form at high temperatures, that is, at about 200° C. and higher, which are required in the extrusion coating of smooth-surfaced substrates, such as metal foils, to insure satisfactory adhesion, or in flat film extrusion to attain maximum film clarity. The excessive volatility of these amides at such high extrusion temperatures makes it difficult to insure the presence of proper and effective concentrations of the amide in the final product.

It has now been found that solid polyolefins, and particularly polyethylene, can be substantially improved as to blocking and frictional properties but still retaining substantially the adhesive and processability properties of unmodified polyolefins by dispersing therein a small amount of 13-docosenamide. This compound is known commercially as Erucamide.

The quantity of 13-docosenamide generally required to improve the slip and blocking properties can be as small as 0.005 percent by weight to as much as 1.25 percent by weight of the solid polyolefin. More particularly, an amount between 0.005 and 0.5 percent and preferably between 0.005 and 0.15 percent by weight of 13-docosenamide is satisfactory for polyolefin compositions free from fillers and pigments. Greater amounts of 13-docosenamide than the preferred amounts for unfilled polyethylene may be required in polyolefin compositions containing filler and/or pigments, and in such compositions an amount up to 1.25 percent maximum may be required since these additives exhibit in varying degree a considerable adsorptive effect for 13-docosenamide and thus reduce its availability within the polyolefin composition to impart dry-surface lubricity thereto. Quantities of 13-docosenamide in excess of those described above produce excessive and undesirable exudation.

Satisfactory dispersion of adequate amounts of 13-docosenamide in a solid polyolefin can be effected by various dispersion techniques familiar to those skilled in the art. Since 13-docosenamide is a waxy solid at room temperature, it can be comminuted and dusted onto pellets of the solid polyolefin. The dusted pellets are then subjected to a hot-compounding operation such as extrusion or hot-milling at temperatures from 110° C. to about 250° C. to produce either a finished product such as film, sheeting, or extruded articles by embodying the improved properties or an intermediate product which can be repelleted for molding, extrusion, or other heat-shaping operations.

Other suitable dry dispersion techniques include the use of Banbury mixers, mono or multiple screw type mixers and kneaders wherein the polyolefin is fluxed or heated to a plastic consistency (110° C.–250° C.) and the 13-docosenamide mixed therein. Extended treatment in a Banbury of a polyolefin and particularly again polyethylene has long been known as an effective means for minimizing the content of "fish eyes" in the polymer, these usually being small transparent gel-like bodies or apparently very high molecular weight or cross-linked polymer and occurring in random distribution. Such extended Banbury treatment for the purpose of removing "fish eyes" does not interfere with or prevent simultaneously satisfactorily dispersing the 13-docosenamide in the polyethylene.

As an alternative to the aforedescribed "dry-type" compounding procedures, volatile solvents both for the polyolefin and the 13-docosenamide such as xylene, toluene, and other aromatic hydrocarbons can be used to form a neutral solution but such procedures generally offer no practical advantages over the dry-type and furthermore, are more costly since the solvent must be subsequently removed. Solvent procedures are indicated, however, when use is made of the 13-docosenamide modified polyolefin as a coating or in the production of films by film casting methods.

The dispersion step for incorporation of the 13-docosenamide can also include the addition of conventional pigments, dyes, and fillers such as carbon black, titanium dioxide, clays, diatomaceous earth, calcium silicates, and others known to the art. Antioxidants for polyolefins such as the aromatic amines and hindered phenols can be included if desired in the 13-docosenamide modifeld composition.

Insofar as is now known, 13-docosenamide is not commercially available. It can be readily prepared, however, by treating either cis- or trans-13-docosenoic acid with thionyl chloride to yield an acyl chloride which is then treated with ammonium hydroxide.

The reactions appear to proceed as follows:

(1) $C_{21}H_{41}COOH + SOCl_2 \rightarrow S_{21}H_{41}COCl + HCl + SO_2$
(2) $C_{21}H_{41}COCl + NH_4OH \rightarrow C_{21}H_{41}CONH_2 + HCl + H_2O$ The product of reaction 2 can be purified by washing with water and then drying over $P_2O_5$. As is evident, the other by-products of the reactions are gases which are readily separated from the recation products during the course of the reactions.

The product prepared by so amidifying a commercial grade of erucic (i.e. cis-13-docosenoic) acid containing 85 percent by weight erucic acid had a melting point of 64° C., an iodine number of 84, and a free fatty acid content (calculated as $C_{21}H_{41}COOH$) of 8.9 percent.

The invention if further exemplified in the following examples.

Example 1

A solid polyethylene (density 0.919 gm./cc. at 23° C. and a melt index value of 2 by ASTM procedure D 1238-52T) in the form of molding granules was dry blended in a tumbler with 0.1 percent by weight of 13-docosenamide. The dry blend was extruded through an extruder equipped with a 4-inch diameter tubular film die and inflated to form 9½ inch wide tubular film layflats (film thickness, 1½ mil.) at a rate of 35 pounds of film per hour and a speed of 50 feet per minute. The temperature of the polyethylene at the die orifice was 175° C.

The extruded molten tubular film leaving the die orifice had a frostline (freezing point) 21-inches above the die as controlled by forced air cooling. The die to nip roll span was 90 inches, and the temperature of the film entering the overhead nip rolls was 60° C. The layflats were checked by hand at the film windup for slip development and blocking (the layflat being one minute aged.) The layflat blocking tendencies were qualitatively measured by the ease of separating the two adjacent film layers forming the layflat along the transverse direction (width) at a freshly cut layflat end. The separation was performed by a combination of sliding and lifting forces exercised on the layflat surfaces while held between the fingers; it is the same natural action used to open a polyethylene bag. The same films were checked after aging about 24 hours for coefficient of friction and blocking value (force required for separation).

The film thus made was characterized by absence of blocking, excellent slip, lower coefficient of friction values than the unmodified polyethylene and had substantially the same optical properties, namely percent haze and specular gloss as the unmodified polyethylene.

In Table I are reported comparative data for the same polyethylene containing no amide; Example 1 of the instant invention containing 0.1 percent by weight of 13-docosenamide; and polyethylene compounded with 0.1 percent by weight of "Armid O" a commercial grade of oleamide marketed by Armour and Co. in the same manner described in Example 1. It will be observed that while both the 13-docosenamide modified polyethylene and the oleamide modified polyethylene exhibited considerably lower kinetic coefficient of friction values than the unmodified polyethylene, but only the 13-docosenamide showed an effective reduction in blocking values when the films were subjected to a five pound load for 24 hours.

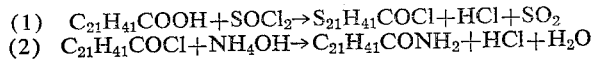

TABLE I

| Modifying Agent | Layflat Condition at Windup | | Kinetic Coefficient of Friction (after aging 24 hrs.) | Blocking Under Compressive Loading, gms. (force to separate) [3] |
|---|---|---|---|---|
| | Blocking [1] | Slip [2] | | |
| None (control) | Partial | Poor | 0.54 | 136 |
| Example 1 (0.1% by weight 13-docosenamide) | None | Fair | 0.11 | 96 |
| Oleamide (0.1% by weight) | do | Excellent | 0.11 | 130 |

[1] This refers to blocking occurring from the normal compressive force applied to the film in the windup or reeling of the freshly extruded film. Partial blocking signifies superficial adherence of film at inside surfaces of the layflat, the surfaces separating freely when applying an opening action. None signifies no adherence of film at inside surfaces of layflat, the surfaces being completely separated before applying opening action.
[2] An excellent slip rating describes two film surfaces sliding readily against each other when the two films are held between two fingers and the films are forced to slide against each other; approximate coefficient of friction being 0.05 to 0.15. A fair slip rating indicates some slight resistance to sliding but no sticking however, the approximate coefficient of friction being between 0.35 and 0.45. A poor slip rating indicates actual film sticking, the approximate coefficient of friction being greater than 0.45.
[3] Blocking values under compressive loading and at elevated temperature were determined by subjecting 6″ x 5″ sections of film between 6″ x 6″ glass plates to a dead weight of five pounds for 24 hours at 60° C. and then measuring the force in grams to separate a 4″ x 5″ area of the so-conditioned film pair.

It is evident from the data in Table I that although the oleamide modified composition had a better slip rating immediately after extrusion than the composition of Example 1, nevertheless after 24 hours' aging both compositions had the same slip rating. In fact, the delayed slip development by the 13-docosenamide containing polyethylene composition prevented telescoping and other difficulties during the film manufacturing process usually encountered with polyethylene compositions containing a fatty acid amide other than 13-docosenamide.

Another unexpected advantage discovered in polyethylene containing amounts of 13-docosenamide not in excess of that hereinbefore prescribed is that its presence does not significantly alter the printability or the adhesive properties of the polyethylene.

As is well known, conventional polyethylene requires special treatment of its surface to improve adhesion of inks and other coatings thereto. Several types of treatment have been proposed in the past, including electron bombardment, controlled oxidation as by immersion in sulphuric acid-sodium dichromate solution, and by rapid exposure to a flame. The flame treatment requires careful control of combustible gas, e.g. propane to air ratios to secure optimum results as measured by ink adhesion.

The 13-docosenamide modified polyethylene composition showed considerably more latitude than either unmodified polyethylene or polyethylene containing a 0.1 percent by weight of oleamide as a slip agent.

The better behaviors in flame treating operations of 13-docosenamide containing polyethylene is demonstrated by the data presented in subsequent Table II.

TABLE II

| Film Sample | Air Rate, ft.³/hr. | Gas (Propane) Rate, ft.³/hr. | Ink Adhesion |
|---|---|---|---|
| Polyethylene | 300 | 10.0 | Very Good. |
|  | 300 | 10.5 | Excellent. |
|  | 300 | 11.0 | Fair. |
|  | 300 | 11.5 | Poor. |
| Polyethylene containing 0.1% by wt. oleamide. | 300 | 10.0 | Do. |
|  | 300 | 10.5 | Do. |
|  | 300 | 11.0 | Do. |
|  | 300 | 11.5 | Fair-Poor. |
|  | 300 | 12.0 | Do. |
|  | 300 | 12.5 | Do. |
|  | 300 | 13.0 | Poor. |
| Example 1, 0.1% by wt. 13-docosenamide. | 300 | 10.0 | Do. |
|  | 300 | 10.5 | Do. |
|  | 300 | 11.0 | Very good. |
|  | 300 | 11.5 | Do. |
|  | 300 | 12.0 | Excellent. |
|  | 300 | 12.5 | Very good. |
|  | 300 | 13.0 | Do. |

Note.—Drum Temperature—50° C; Flame Distance—½″ from film; Web Speed—100 ft./min.

These data show the following:

(1) The 13-docosenamide containing polyethylene films are easier to flame-treat than those containing oleamide. Excellent ink adhesion was obtained with the former film, whereas only fair to good ink adhesion was obtained with the latter. More severe treating conditions were necessary with the oleamide modified film than with 13-docosenamide modified films as judged by the increased gas rate needed with the former.

(2) 13-docosenamide modified polyethylene films can be flame treated over a much wider range of conditions to yield acceptable ink adhesion than those containing oleamide. This wider range offers the film converter an advantage since close regulation of treating equipment is not required to get good ink adhesion.

*Example 2*

In a demonstration of the delayed sweat-out behaviors of 13-docosenamide modified polyethylene compositions in contrast to the practically immediate sweat-out exhibited by oleamide modified composition, the following experiments illustrate this distinction.

These two agents were compounded at 0.5 percent into the polyethylene described in Example 1 to form masterbatches (concentrates). The masterbatches of each were used to form new compositions at lower concentrations of the agents in the same polyethylene resin by dry blending masterbatch granules with the unmodified polyethylene granules. The dry blended compositions were extruded into 1½ mil, 10-inch tubular film layflats. The extrusion was carried out in an extruder equipped with a 4-inch diameter tubular die. The compositions emerged at a temperature of 150° C. at the die orifice. The film was extruded at the rate of 20 lbs./hr. and 28 feet per minute with a 5-7 inch frostline (freezing point above die top) as controlled by forced air cooling.

The coefficient of friction of the extruded films were measured in-line between the overhead nip rolls (collapsing arrangement to transform a tube to a layflat) and the floor windup. The in-line friction reading was accomplished by running the layflat over a table top just prior to entering the floor windup. A weighted sled attached to a strain gage (stationary) was permitted to rest on the film as it passed over the flat (table top) surface. The table top was covered with bleached kraft paper and the sled was wrapped with a piece of unmodified polyethylene extruded film. A new piece of unmodified film was wrapped around the sled for each in-line friction reading. The coefficient of friction was calculated by dividing the strain gage reading in grams by the weight of the sled. The timing of film leaving the die to the point of in-line friction determination was 50 seconds. The temperature of the extruded film at this point was 25°–28° C.

The films from each composition were also tested for coefficient of friction after 24 hours aging.

| Slip Agent Evaluated | Percent by Wt. Concentration of Slip Agent in Film Composition | Coefficient of Friction | |
|---|---|---|---|
|  |  | In-line (50 sec.) | Aged (24 hrs.) |
| None (control) |  | 1.0 | 0.6 |
| Oleamide | 0.1 | 0.4 | 0.1 |
| 13-docosenamide | 0.1 | 0.7 | 0.1 |
| Oleamide | 0.035 |  | 0.2 |
| 13-docosenamide | 0.035 |  | 0.2 |

The above results show that 13-docosenamide sweats out (exudes) at a much slower rate than the oleamide but the final (24 hours) coefficient of frictions are of the same values. This slower sweat out rate of 13-docosenamide is of major importance in that the degree of developed slip at the windup is of such a lower order that all process difficulties normally associated with oleamide modified compositions are eliminated and the film can be rolled up without the film layers on the roll telescoping. Also, less tension need be applied to the film during windup if telescoping has been lessened. The lower tension on the film in the roll diminishes film distortions resulting from cold stretching effects. These distortions interfere with processing of the film into useful end products.

If desired, conventional antioxidants may be included in the 13-docosenamide modified polyethylene compositions, such antioxidant including, but not being limited to, the various aromatic amines and the hindered phenols. For example, the incorporation of 0.02 percent by weight of 2,6-di-tert.-butyl-4-methyl phenol to the polyethylene composition of Example 2 containing 0.035 percent by weight of 13-docosenamide and then processing it into film substantially in the same manner resulted in film having equivalent improved slip and non-blocking properties.

The presence of 13-docosenamide in polyethylene compositions in the amounts herein described imparts no significant change in the clarity or specular gloss of polyethylene films produced therefrom.

What is claimed is:

1. Composition comprising a normally solid polyolefin selected from the group consisting of polyethylene, polypropylene, copolymers of ethylene and propylene, and copolymers of ethylene and styrene, and at least 0.005 percent by weight to 1.25 percent of 13-docosenamide, said composition being characterized by a lower coefficient of friction and a lower blocking value than the unmodified polyolefin.

2. Composition according to claim 1 wherein the amount of 13-docosenamide is between about 0.005 and 0.5 percent by weight of the polyolefin.

3. Polyethylene composition characterized by improved resistance to blocking and having a lower coefficient of friction than unmodified polyethylene comprising a normally solid polyethylene in admixture with between 0.005 and 1.25 percent by weight of 13-docosenamide.

4. Polyethylene composition characterized by improved resistance to blocking and having a lower coefficient of friction than unmodified polyethylene comprising a normally solid polyethylene in admixture with between 0.005 and 0.5 percent by weight of 13-docosenamide.

5. Polyethylene composition characterized by improved resistance to blocking and having a lower coefficient of friction than unmodified polyethylene comprising a normally solid polyethylene in admixture with between 0.005 and 0.15 percent by weight of 13-docosenamide.

6. Polyethylene film of reduced blocking tendencies, said film comprising a normally solid polyethylene containing between 0.005 and 1.25 percent by weight of 13-docosenamide.

7. Polyethylene film comprising a normally solid polyethylene containing between 0.005 and 0.15 percent by weight of 13-docosenamide.

8. Process for reducing the blocking tendencies of normally solid polyethylene which comprises dispersing in said polyethylene between 0.005 and 1.25 percent by weight thereof of 13-docosenamide.

9. Process for reducing the blocking tendencies of normally solid polyethylene which comprises mixing said polyethylene with between 0.005 and 1.25 percent by weight of 13-docosenamide at a temperature between 110° C. and 250° C.

10. Polyethylene composition having improved resistance to blocking and having a lower coefficient of friction than unmodified polyethylene comprising a normally solid polyethylene in admixture with 0.1 percent by weight of the polyethylene of Erucamide.

11. Normally solid polyethylene containing 0.01 to 1% by weight of Erucamide based on the polyethylene.

References Cited

UNITED STATES PATENTS

| 2,770,608 | 11/1956 | Barker et al. | 260—32.6 |
| 2,770,609 | 11/1956 | Symonds | 260—32.6 |

FOREIGN PATENTS 1,132,791  11/1956  France.

MORRIS LIEBMAN, *Primary Examiner.*

DANIEL ARNOLD, *Examiner.*

A. G. MORIN, R. G. WEILACHER,
*Assistant Examiners.*